United States Patent [19]

Kubota et al.

[11] Patent Number: 5,029,288

[45] Date of Patent: Jul. 2, 1991

[54] METHOD AND APPARATUS FOR OPERATING A VARIABLE SPEED POWER GENERATION SYSTEM

[75] Inventors: Yuzuru Kubota, Hitachi; Toshiaki Okuyama, Ibaraki, both of Japan

[73] Assignee: Hitachi, Ltd., Tokyo, Japan

[21] Appl. No.: 340,681

[22] Filed: Apr. 20, 1989

[30] Foreign Application Priority Data

Apr. 22, 1988 [JP] Japan .................................. 63-99365

[51] Int. Cl.⁵ ............................ H02P 9/00; H02P 9/46
[52] U.S. Cl. ........................................ 322/29; 322/35; 322/47
[58] Field of Search ...................... 322/29, 35, 47, 23, 322/27

[56] References Cited

U.S. PATENT DOCUMENTS

| | | | |
|---|---|---|---|
| 4,661,762 | 4/1987 | Baker ................................ | 322/29 X |
| 4,697,135 | 9/1987 | Brandon ............................ | 322/29 X |
| 4,870,339 | 9/1989 | Furukawa et al. ................ | 322/29 |

Primary Examiner—R. J. Hickey
Attorney, Agent, or Firm—Antonelli, Terry, Stout & Kraus

[57] ABSTRACT

A method and apparatus for operating a variable speed power generation system in which the generated output of an induction generator is adjusted by controlling current in the secondary side of the induction generator. Rotation speeds of the induction generator coupled to a prime mover are detected, a secondary current command for controlling a difference between a detected rotation speed and a speed command to be zero is generated, and current in the secondary side of the induction generator is controlled on the basis of the secondary current command. In addition, the generated output of the induction generator is sequentially detected in order that a command value of the speed command is sequentially changed when a detected generated output shows a tendency to increase and, when a detected generated output shifts from an increasing tendency to a decreasing tendency, the command value of the speed command is once changed to a lower speed value and thereafter returned to a higher speed value, thereby maximizing efficiency of the variable speed power generation system and reducing costs.

5 Claims, 4 Drawing Sheets

METHOD AND APPARATUS FOR OPERATING A VARIABLE SPEED POWER GENERATION SYSTEM

BACKGROUND OF THE INVENTION

This invention relates to a method and apparatus for operating a variable speed power generation system and more particularly to a method and apparatus for operating a variable speed power generation system of the type which is suitable for regulating the generated output or power of an induction generator by controlling current in the secondary side of the generator coupled to a prime mover.

Conventionally, as described in Electric Engineering Handbook published by the Institute of Electrical Engineers of Japan, Tokyo, Japan, in Apr., 1978, pp. 1108 to 1109, the power generation system employs a governor which controls the output of the prime mover. More particularly, it has been the practice that when the load remains unchanged, the water wheel is operated at a prescribed rotation speed, but when the load is changed and unbalanced with the water wheel output to change the rotation speed, the change in the rotation speed is detected and the governor is operated in accordance with this change to control the flow rate for the water wheel, whereby the amount of power generation of the synchronous generator can be so controlled as to maintain the prescribed rotation speed. However, the governor used for controlling power in the conventional power generation system is required to have a complicated control mechanism and its maintenance and inspection is time-consuming. In addition, the governor can not achieve highly efficient power control without difficulties.

Another method of operating generators with high efficiencies is described in JP-A-62-118068, according to which torque of a generator is controlled on the basis of the rotation speed and generated output of the generator. This control method, however, could not be properly applied without changes to the system which efficiently controls the generated output of a wound-rotor induction generator by controlling current in the secondary side of the generator coupled to the water wheel.

SUMMARY OF THE INVENTION

A major object of this invention is to provide an operating method and apparatus for a variable speed power generation system which can always maintain the generated output of an induction generator at maximum power by controlling current in the secondary side of the induction generator.

Another object of this invention is to provide an operating method and apparatus for a variable speed power generation system which can maximize efficiency of the power generation system to attain elimination of the governor and reduction of costs.

According to the invention, to accomplish the above objects, in a method for operating a variable speed power generation system in which rotation speeds of an induction generator coupled to a prime mover are detected, a secondary current command for controlling the difference between a detected rotation speed and a speed command to be zero is generated and current in the secondary side of the generator is controlled on the basis of the secondary current command, the generated output of the generator is sequentially detected, the command value of the speed command is sequentially changed to a higher speed value when a detected generated output shows a tendency to increase and, when a detected generated output shifts from an increasing tendency to a decreasing tendency, the command value of the speed command is once changed to a lower speed value and thereafter returned to a higher speed value.

An apparatus of the invention for implementing the operating method comprises a speed detector for sequentially detecting the rotation speed of the generator, a forward converter for converting AC power on the secondary side of the generator into DC power, an inverse converter for inversely converting the DC power into AC power, a speed adjuster for receiving a speed signal from the speed detector and a speed command signal from a speed command circuit and controlling the difference between the two signals to be zero, a current adjuster for receiving a secondary current command signal from the speed adjuster and a current detection signal from a current detector and producing a switching signal used to make the difference between the two signals to be zero, and a generated output detector, connected to the speed command circuit, for detecting the generated output of the generator on the basis of the speed signal and secondary current command signal.

By sequentially detecting the generated output of the generator during operation thereof, sequentially changing the command value of the speed command to a higher speed value when a detected generated output shows a tendency to increase, and when a detected generated output shifts from an increasing tendency to a decreasing tendency, once changing the command value of the speed command to a lower speed value and thereafter returning it to a higher speed value so that the command value of the speed command is alternately changed to be higher and lower speed values, the generated output of the generator can always be maintained at maximum power.

BRIEF DESCRIPTION OF THE DRAWINGS

Preferred embodiments of the present invention will now be described in conjunction with the accompanying drawings in which.

DESCRIPTION OF THE PREFERRED EMBODIMENTS

A first embodiment of the invention will now be described with reference to FIG. 1.

Figure 1:
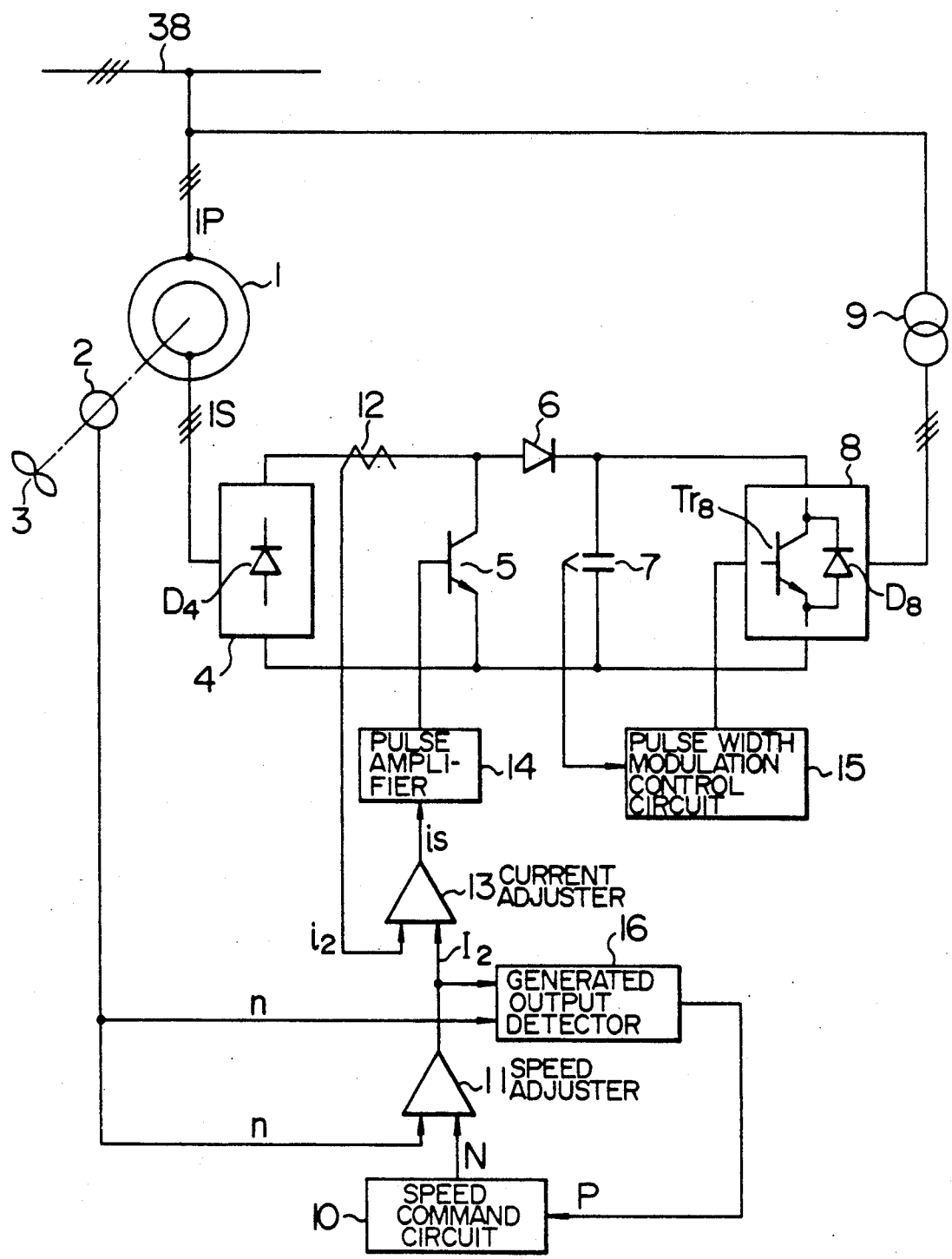
FIG. 1 is a diagram showing the construction of a first embodiment of the invention.

In FIG. 1, a wound-rotor induction generator (hereinafter simply referred to as a generator) 1 is coupled to a water wheel 3 serving as prime mover and it has a primary side 1P connected to a transmission system 38 and a secondary side 1S connected to a forward converter 4. The forward converter 4 has a rectifying element such as diode D4 and is operable to convert AC power on the secondary side 1S of the generator 1 into DC power. The output of the forward converter 4 is connected to an inverse converter 8 through a backward flow blocking diode 6 and a smoothing capacitor 7. The output of the forward converter 4 is also connected to a control transistor 5 serving as a secondary chopper circuit. The control transistor 5 may be on/off controlled to control the output current of the forward converter 4 so that current in the secondary side 1S of the generator 1 may be controlled. The inverse converter 8 has a transistor Tr8 and a diode D8. The transistor Tr8 is on/off controlled by an output signal from a pulse width modulation control circuit 15 to convert DC power into AC power which in turn is delivered to the transmission system 38 through a transformer 9. Thus, when a charge voltage on the smoothing capacitor 7 exceeds a predetermined value, a surplus of power stored in the capacitor 7 is regeneratively returned to the primary side 1P of the generator 1 through the transformer 9.

The generated output or power of the generator 1 is controlled on the basis of its rotation speed and current in the secondary side 1S. Therefore, the rotation speed of the generator 1 is detected by a speed detector 2 and the current in the secondary side 1S of the generator 1 is detected by a current detector 12 provided in the output circuit of the forward converter 4. The output signal of the speed detector 2 is applied to a speed adjuster 11 and a generated output detector 16, and the output signal of the current detector 12 is applied to a current adjuster 13. The speed adjuster 11 is supplied with a speed signal n from the speed detector 2 and a speed command signal N from a speed command circuit 10 is operable to and deliver to the current adjuster 13 a secondary current command signal $I_2$ representing the difference between the two signal n and N and which is controlled to be zero. The current adjuster 13 receives the secondary current command signal $I_2$ along with a current detection signal $i_2$ delivered out of the current detector 12 and delivers to a pulse amplifier 14 a switching signal $i_s$ which represents the difference between the two signals $i_2$ and $I_2$ and which is controlled to be zero. The pulse amplifier 14 is operable to effect switching control for the transistor 5 on the basis of the switching signal $i_s$. Thus, in the system shown in FIG. 1, the rotation speed of the generator 1 is detected by the speed detector 2, the secondary current command (secondary current command signal $I_2$) for controlling the difference between the detected rotation speed (speed signal n) and speed command (speed command signal N) to zero is generated, and the switching operation of the transistor 5 is controlled on the basis of the secondary current command $I_2$ to control the current in the secondary side 1S of the generator 1. The speed command circuit 10 in this system responds to the output signal of the generated output detector 16 to produce the speed command signal N. In this manner, the first embodiment of the invention shown in FIG. 1 takes advantage of the fact that the generated output or power changes with the rotation speed of the generator 1 and in this embodiment, the speed command is corrected on the basis of the generated output. In particular, due to the fact that the generated output can be derived from the product of rotation speed and torque, the generated output P of the generator 1 is detected by the generated output detector 16 responsive to the speed signal n and secondary current command signal $I_2$.

Figure 2:
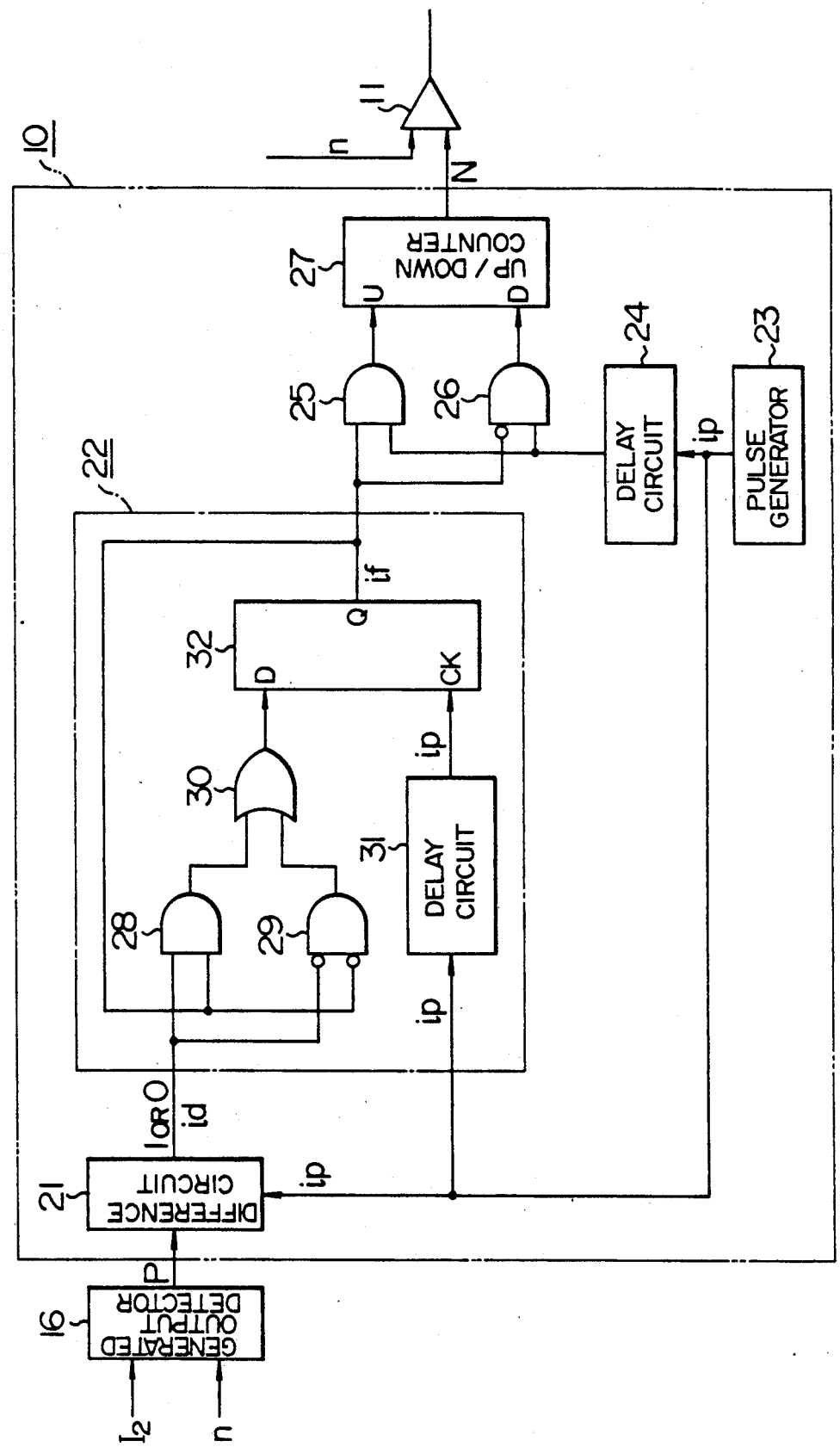
FIG. 2 is a specific circuit diagram of a speed command circuit used in FIG. 1.

FIG. 2 shows a specific current construction of the speed command circuit 10 used in the FIG. 1 system.

Referring to FIG. 2, the speed command circuit 10 comprises a difference circuit 21, a logic circuit 22, a pulse generator 23, a delay circuit 24, AND gates 25 and 26, and an up/down counter 27. The difference circuit 21 is connected to the generated output detector 16 and the up/down counter 27 is connected to the speed adjuster 11. The logic circuit 22 includes AND gates 28 and 29, an OR gate 30, a delay circuit 31 and a flip-flop 32. The logic circuit 22 receives input signals from the difference circuit 21 and pulse generator 23 and delivers an output signal to the AND gates 25 and 26.

The pulse generator 23 supplies a pulse signal $i_p$ at a constant period to the difference circuit 21 and delay circuits 24 and 31. In synchronism with the pulse signal $i_p$, the difference circuit 21 receives the generated output or power P from the generated output detector 16, calculates the difference $P_2 - P_1$ between generated output $P_2$ at present and generated output $P_1$ in precedence (preceding by one pulse in the pulse signal) and delivers a signal $i_d$ of "1" when the generated output P shows a tendency to increase or $P_2 - P_1 > 0$ and a signal $i_d$ of "0" when the generated output P shows a tendency to decrease or $P_2 - P_1 < 0$. The output signal $i_d$ of the difference circuit 21 is fed to an input terminal D of the flip-flop 32 through the AND gates 28 and 29 and OR gate 30. The pulse signal $i_p$ is fed to a clock terminal CK of the flip flop 32 through the delay circuit 31. The timing for the pulse signal $i_p$ from the pulse generator 23 to be applied to the clock terminal CK is adjusted by the delay circuit 31 with respect to the timing for the output signal $i_d$ of the difference circuit 21 to be applied to the input terminal D of the flip-flop 32. More specifically, the pulse signal $i_p$ applied to the clock terminal CK is delayed by means of the delay circuit 31 by an amount equal to a delay of the output signal $i_d$ of difference circuit 21 which is caused by the AND gates 28 and 29 and OR gate 30. In synchronism with the rise of the pulse signal $i_p$ applied to the clock terminal CK, the flip-flop 32 operates to deliver, from its Q terminal, a signal of "1" when the "1" signal is applied to the input terminal D, but a signal of "0" when the "0" signal is applied to the input terminal D. The output signal $i_d$ of the difference circuit 21 is "0" upon start-up of the generator and under this condition, the output of the AND gate 28 is "0" and the output of the AND gate 29 is "1" with the result that the output of the OR gate 30 assumes the "1" level which inverts output signal $i_f$ of the flip-flop 32 from "0" to "1". Then, the logic circuit 22 produces an up command which brings the command value of the speed command to a higher speed value. Subsequently, the rotation speed of the generator 1 increases and therefore the difference circuit 21 produces the output signal $i_d$ of "1" to cause the AND gate 28 to produce the "1" output signal, so that the output signal $i_f$ of the flip-flop 32 keeps the "1" state and the up command is sequentially delivered out of the logic circuit 22.

The AND gates 25 and 26 are supplied with the pulse signal $i_p$ from the pulse generator 23 through the delay circuit 24 in order that a time delay in the application of the output signal if to the AND gates 25 and 26 can be absorbed by means of the delay circuit 24. Under the delivery of the "1" signal from the logic circuit 22, the AND gate 25 produces the output signal of "1", causing the up/down counter 27 to deliver the speed command signal N which brings the command value of speed command to a higher speed value. Conversely, when the output signal of the logic circuit 22 assumes "0", the AND gate 26 produces the output signal of "1", causing the up/down counter 27 to deliver the speed command signal N which brings the command value of speed command to a lower speed value.

With the above construction, the generator 1 is operated on the basis of the speed command signal N from the speed command circuit 10 and even when the output signal of the difference circuit 21 is "0" upon start-up of the generator, the up/down counter 27 operates to deliver the speed command signal N designating a higher speed value and the rotation speed of the generator 1 can be increased sequentially.

Figure 3B:
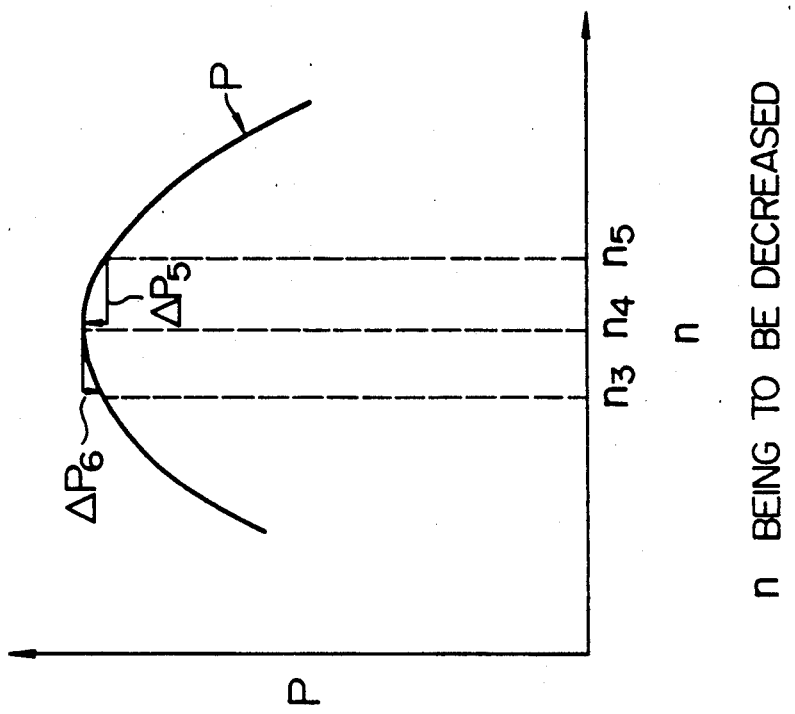
FIGS. 3A and 3B are graphs showing the relation between rotation speed and generated output which is useful for explaining the method of operating the variable speed power generation system of the invention shown in FIG. 1.
Figure 3A:
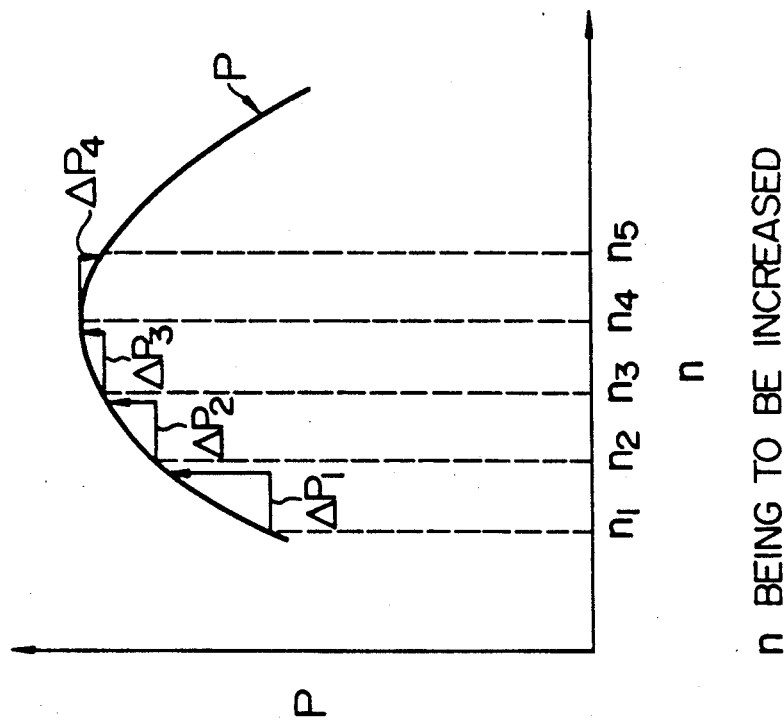

Referring to FIG. 3A and 3B, the relation between rotation speed and generated output is graphically illustrated for the purpose of explaining the method of operating the FIG. 1 variable speed power generation system according to the first embodiment of the invention.

In the system of FIG. 1, the generated output P of the generator 1 is sequentially detected as the rotation speed of the generator 1 increases from $n_1$ to 10 $n_4$ as shown in FIG. 3A. The generated output P shows a tendency to increase until the rotation speed reaches $n_4$ and as a result, the difference circuit 21 continues to deliver the "1" output signal $i_d$, the output signal of the logic circuit 22 keeps "1" and the up/down counter 27 produces the speed command signal N designating a higher speed value. Even after the generated output P is saturated upon arrival of the rotation speed of the generator 1 at $n_4$, the speed command signal N designates a higher speed value and the rotation speed of the generator 1 takes $n_5$. At that time, however, the generated output P shows a tendency to decrease and consequently, each of the output signals of the difference circuit 21 and logic circuit 22 is inverted from "1" to "0" and as shown in FIG. 3B, the up/down counter 27 produces the speed command signal N for designating a lower speed value, thereby decreasing the rotation speed of the generator 1.

When the rotation speed of the generator 1 decreases from $n_5$ to $n_4$, the generated output P shifts to show a tendency to increase and as a result, the output signal $i_d$ of the difference circuit 21 is inverted from "0" to "1". At that time, however, the output signal of the logic circuit 22 still remains "0" and therefore the rotation speed of the generator 12 further decreases. Subsequently, upon arrival of the rotation speed of the generator 1 at $n_3$, the output signal $i_d$ of the difference circuit 21 is inverted from "1" to "0" but concurrently therewith, the output signal of the flip-flop 32 is inverted from "0" to "1" because of the output signal of logic circuit 22 being "0" and the rotation speed of the generator 1 increases. In this manner, the rotation speed of the generator 1 can be maintained in the range of from $n_3$ to $n_5$ and the generator 1 can be operated in the range of maximized generated output P.

As described above, in this embodiment, the generator 1 with its secondary side excited is operated by the water wheel 3 at speeds exceeding the synchronous speed, that is, in the range of negative slip to serve as an induction generator, and the amount of generated output of the generator 1 changes with its rotation speed when the flow rate or head for the water wheel 3 is fixed. Therefore, in order to draw maximum power from the generator 1, an increase or decrease in the generated output of the generator 1 is determined by the difference circuit 21 each time one step speed command is issued, the speed command is changed on the basis of the results of the determination and current in the secondary side of the generator 1 is controlled on the basis of a change speed command to permit the generator 1 to be operated with maximized generated output.

Figure 4:
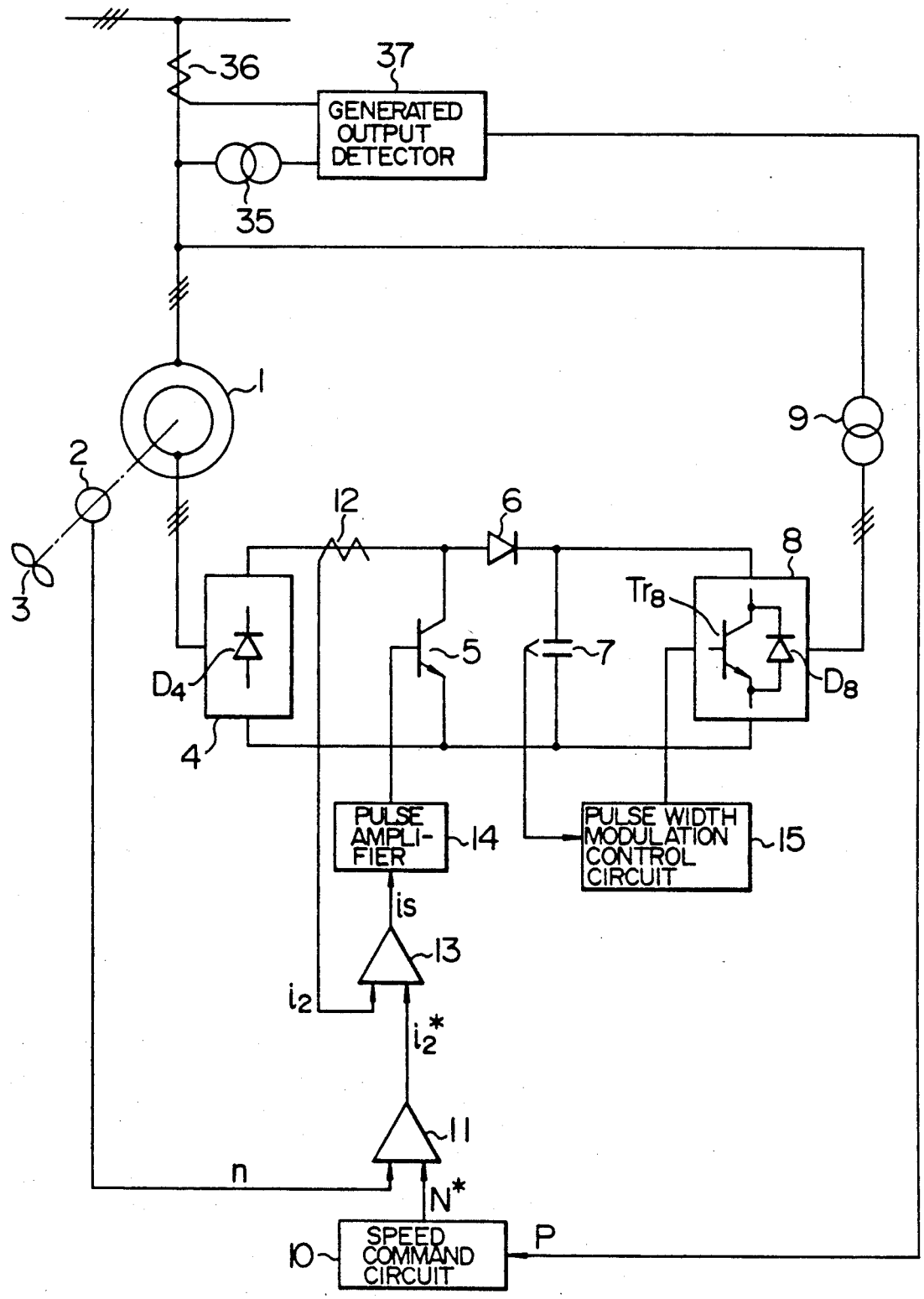
FIG. 4 is a diagram showing the construction of a second embodiment of the invention.

In the first embodiment of the invention, the generated output of the generator 1 has between described as being derived from the speed signal n and secondary current command signal $I_2$. But in a second embodiment of the invention as shown in FIG. 4, a voltage detector 35 and a current detector 36 are provided on the primary side of the generator 1 and detection output signals of the detectors 35 and 36 are fed to a generated output detector 37 so that the generated output may be derived from the output signals of the detectors 35 and 36. In FIG. 4, elements identical to those of FIG. 1 are designated by identical reference numerals.

As described above, the present invention can change the speed command to ensure that the generated output of the induction generator can always be maximized and it therefore can attain beneficial effects that efficiency of the power generation system can be maximized and the governor can be dispensed with to contribute to cost reduction.

We claim:

1. A method for operating a variable speed power generation system in which rotation speeds of an induction generator coupled to a prime mover are detected, a secondary current command for controlling the difference between a detected rotation speed and a speed command to be zero is generated, and current in the secondary side of said generator is controlled on the basis of the secondary current command, said operating method comprising the steps of:
    sequentially detecting a generated output of said induction generator;
    sequentially changing a command value of the speed command to a higher speed value when the detected generated output shows a tendency to increase; and
    when the detected generated output shifts from an increasing tendency to a decreasing tendency, once changing the command value of the speed command to a lower speed value and thereafter returning the command value of the speed command to a higher speed value.

2. An operating method according to claim 1, wherein the generated output of said induction generator is derived from a signal proportional to the current in the secondary side of said induction generator and a signal proportional to the rotation speed of said induction generator.

3. An operating method according to claim 1, wherein the generated output of said induction generator is derived from voltage and current in the primary side of said induction generator.

4. An apparatus for operating a variable speed power generation system comprising:
    an induction generator coupled to a prime mover and having a primary side thereof connected to a three-phase transmissions system;
    a speed detector, connected to said induction generator, for sequentially detecting a rotation speed of said induction generator;
    a forward converted, connected to a secondary side of said induction generator, for converting AC power on the secondary side of said induction generator into DC power;

a control transistor, connected to an output of said forward converter, for controlling output current of said forward converter;

an inverse converter, connected to said forward converter through a backward flow blocking diode and a smoothing capacitor, for converting the DC power into AC power;

a speed adjuster for receiving a speed signal n from said speed detector and a speed command signal N from a speed command circuit and for controlling a difference between the signals n and N to be zero;

a current detector for detecting current in the secondary side of said induction generator;

a current adjuster for receiving a secondary current command signal $I_2$ from said speed adjuster and a current detection signal $i_2$ from said current detector and for producing a signal $i_S$ for making a difference between the signals $I_2$ and $i_2$ to be zero;

a pulse amplifier for controlling switching of said control transistor on the basis of the signal $i_s$;

a generated output detector, connected to said speed command circuit, for detecting a generated output of said induction generator on the basis of said speed signal n and secondary current command signal $I_2$, whereby said speed adjuster generates the secondary current command signal $I_2$ for controlling the difference between the detected speed signal n and the speed command signal N to be zero and said current adjuster controls the switching operation of said control transistor on the basis of said secondary current command signal $I_2$ to control the current in the secondary side of said induction generator.

5. An apparatus of operating a variable speed power generation system comprising:

an induction generator coupled to a prime mover and having a primary side thereof connected to a three-phase transmission system;

a speed detector, connected to said induction generator, for sequentially detecting a rotation speed of said induction generator;

a forward converter, connected to a secondary side of said induction generator, for converting AC power on the secondary side of said induction generator into DC power;

a control transistor, connected to an output of said forward converter, for controlling output current of said forward converter;

an inverse converter, connected to said forward converter through a backward flow blocking diode and a smoothing capacitor, for converting the DC power into AC power;

a speed adjuster for receiving a speed signal n from said speed detector and a speed command signal $N^*$ from a speed command circuit and for controlling a difference between the signals n and $N^*$ to be zero;

a current detector for detecting current in the secondary side of said induction generator;

a current adjuster for receiving a secondary current command signal $i_2^*$ from said speed adjuster and a current detection signal $i_2$ from said current detector and for producing a signal $i_S$ for making a difference between the signals $i_2^*$ and $I_2$ to be zero;

a pulse amplifier for controlling switching of said control transistor on the basis of the signal $i_s$;

a voltage detector provided on the primary side of said induction generator;

a current detector provided on the primary side of said induction generator; and a power detector for receiving detection output signals of said voltage detector and said current detector and for controlling said speed command circuit in accordance therewith, whereby said speed adjuster generates the secondary current command signal $i_2^*$ for controlling the difference between the detected speed signal n and the speed command signal $N^*$ to be zero and said current adjuster controls the switching operation of said control transistor on the basis of said secondary current command signal $i_2^*$ to control the current in the secondary side of said induction generator.

* * * * *